(12) United States Patent
Zhang et al.

(10) Patent No.: US 9,294,531 B2
(45) Date of Patent: Mar. 22, 2016

(54) SIGNALING AND PROCESSING CONTENT WITH VARIABLE BITRATES FOR ADAPTIVE STREAMING

(71) Applicant: Futurewei Technologies, Inc., Plano, TX (US)

(72) Inventors: Shaobo Zhang, Shenzhen (CN); Xin Wang, Rancho Palos Verdes, CA (US); Alexander Giladi, Princeton, NJ (US); Xin Liu, Shenzhen (CN); Yangpo Xu, Shenzhen (CN); Changquan Ai, Shenzhen (CN); Peiyun Di, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 347 days.

(21) Appl. No.: 13/939,552

(22) Filed: Jul. 11, 2013

(65) Prior Publication Data

US 2014/0019633 A1 Jan. 16, 2014

Related U.S. Application Data

(60) Provisional application No. 61/670,997, filed on Jul. 12, 2012, provisional application No. 61/672,622, filed on Jul. 17, 2012.

(51) Int. Cl.
*H04L 29/06* (2006.01)

(52) U.S. Cl.
CPC ............ *H04L 65/601* (2013.01); *H04L 65/602* (2013.01); *H04L 65/607* (2013.01); *H04L 65/608* (2013.01); *H04L 65/80* (2013.01)

(58) Field of Classification Search
CPC ... H04L 65/601; H04L 65/602; H04L 65/607; H04L 65/608; H04L 65/80
See application file for complete search history.

(56) References Cited

U.S. PATENT DOCUMENTS

| | | | | |
|---|---|---|---|---|
| 8,837,601 | B2 * | 9/2014 | Ronca | H04N 19/00521 375/240.16 |
| 2010/0316126 | A1 * | 12/2010 | Chen | H04N 19/124 375/240.16 |

(Continued)

FOREIGN PATENT DOCUMENTS

EP 2437458 A1 4/2012

OTHER PUBLICATIONS

Martinez, J., et al., "Objective Video Quality Metrics: A Performance Analysis," 14th European Signal Processing Conference (EUSIPCO 2006), Florence, Italy, Sep. 4-8, 2006, 5 pages.

(Continued)

*Primary Examiner* — Michael C Lai
(74) *Attorney, Agent, or Firm* — Conley Rose, P.C.; Grant Rodolph; Adam J. Stegge

(57) ABSTRACT

A method for adaptive streaming of a media content, wherein the method comprises receiving a media presentation description that provides presentation information for the media content, determining a plurality of representations from the media presentation description that comprise segments that are provided with bitrate and quality information, selecting a media segment that meets a desired quality level to download from one of the representations, updating a buffered media time for downloading the media segment, and determining when to switch to another representation by comparing the buffered media time to a switching threshold value.

6 Claims, 5 Drawing Sheets

(56) References Cited

U.S. PATENT DOCUMENTS

| | | |
|---|---|---|
| 2012/0147958 A1 | 6/2012 | Ronca et al. |
| 2013/0050254 A1* | 2/2013 | Tran .......................... G06F 3/14 345/629 |
| 2013/0185399 A1* | 7/2013 | Appleby ............... H04L 65/607 709/219 |

OTHER PUBLICATIONS

"Information Technology—Dynamic Adaptive Streaming over HTTP (DASH)—Part 1: Media Presentation Description and Segment Formats," International Standard, ISO/IEC 23009-1, First Edition, Apr. 1, 2012, 134 pages.

Lakshman, T.V., et al., "VBR Video: Trade-Offs and Potentials," 1998, 55 pages.

Foreign Communication From a Counterpart Application, PCT Application No. PCT/US2013/050035, International Search Report dated Jan. 16, 2013, 8 pages.

Foreign Communication From a Counterpart Application, PCT Application No. PCT/US2013/050035, Written Opinion dated Jan. 16, 2013, 15 pages.

Foreign Communication From a Counterpart Application, PCT Application No. PCT/US2013/050035, Invitation to Pay Additional Fees dated Oct. 21, 2013, 8 pages.

Wikipedia, "Variable Bitrate," XP002714374, retrieved from http://en.wikipedia.org/w/index.php?title=variable_bitrate&oldid-497537592, Jun. 14, 2012, 4 pages.

Wikipedia, "Dynamic Adaptive Streaming over HTTP," Wikipedia, Old Revision, XP002714354, retrieved from http://en.wikipedia.org/w/index.php?title=Dynamic_Adaptive_Stream_over_HTTP&oldid=501268397, Jul. 8, 2012, 2 pages.

* cited by examiner

SIGNALING AND PROCESSING CONTENT WITH VARIABLE BITRATES FOR ADAPTIVE STREAMING

CROSS-REFERENCE TO RELATED APPLICATIONS

The present application claims priority to U.S. Provisional Patent Application No. 61/670,997 filed Jul. 12, 2012 by Shaobo Zhang, et al. and entitled "System and Method for Signaling and Processing Content with Variable Bitrates for Adaptive Streaming," and U.S. Provisional Patent Application No. 61/672,622 filed Jul. 17, 2012 by Xin Wang, et al. and entitled "System and Method for Signaling and Processing Content with Variable Bitrates for Adaptive Streaming," all of which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Web-media streaming has become common place as smart phones, tablets, notebooks, Internet connected televisions, and other devices configured to access the Internet increase in popularity. State-driven network protocols, such as Real Time Streaming Protocol (RTSP) and Real-time Transport Protocol (RTP) are typically used to implement web-media streaming, such as video conferencing. One reason for this is because of the real-time nature of RTSP/RTP that promotes the frequent communication between a client and streaming server via a RTSP/RTP session. For example, once a client connects to the streaming server to establish a session, the streaming server may transmit media content (e.g. video conferencing) as a continuous stream of data and track the state of the client's state until the client disconnects from the streaming server. However, the real-time nature of RTSP/RTP also suffers drawbacks, such as video distortions. In RTSP/RTP, data that is late or lost because of network congestion is generally dropped or ignored within the RTSP/RTP session. In the context of video conferencing and other types of video streaming, dropping data prevents playback stoppage, but may cause video distortions. Although optimization schemes have been implemented for RTSP/RTP to limit video distortion, the optimization schemes are unable to eliminate all video distortions. Video distortions have become a primary concern for premium content providers as users continually demand for better video quality and better viewing experience.

One alternative that alleviates video distortion is the use of adaptive streaming, such as Dynamic Adaptive Streaming over Hypertext Transfer Protocol (HTTP) (DASH). Specifically, DASH delivers media content through HTTP based content distribution networks. In contrast to RTSP/RTP, HTPP is stateless and handles client requests one transaction at a time. When DASH delivers media content to a user device, the user device may dynamically select appropriate segments to download based on a variety of factors, such as network conditions, device capability, and user choice. For example, the user device may select a segment with the highest resolution or bitrate possible that can be downloaded in time for playback without causing stalling or re-buffering events when playing back video or other media types. Thus, the user device may seamlessly adapt its media content playback to changing network conditions. Unfortunately, the current DASH standard is typically configured to support encoding media content as constant bitrate (CBR) streams or streams with small bitrate variation and is less compatible with managing variable bitrate (VBR) streams, which is another type of media content encoding. The lack of support for VBR streams may impede DASH's ability to efficiently manage and deliver media content to end users.

SUMMARY

In one embodiment, the disclosure includes a method for preparing media content for adaptive streaming, wherein the method comprises determining a target quality for a media content that comprises a plurality of segments, detecting a plurality of content types that indicate a plurality of complexity for the segments, determining a plurality of bitrates for the content types using the target quality, and encoding the segments using the bitrates.

In another embodiment, the disclosure includes a computer program product comprising computer executable instructions stored on a non-transitory medium that when executed by a processor causes a node to perform the following receive a plurality of media segments for a media presentation, and receive the presentation description that provides information about the media segments, wherein the presentation description comprises a representation element, and wherein the representation element indicates whether the media content is provisioned as segments with different bitrates.

In yet another embodiment, the disclosure includes a method for adaptive streaming of a media content, wherein the method comprises receiving a media presentation description that provides presentation information for the media content, determining a plurality of representations from the media presentation description that comprise segments that are provided with bitrate and quality information, selecting a media segment that meets a desired quality level to download from one of the representations, updating a buffered media time for downloading the media segment, and determining when to switch to another representation by comparing the buffered media time to a switching threshold value.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
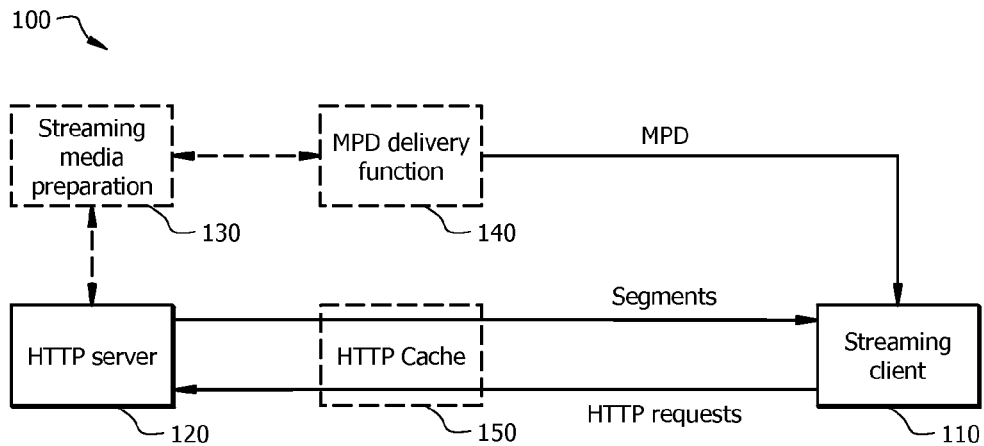
FIG. 1 is a schematic diagram of an embodiment of a media streaming scheme where embodiments of the present disclosure may operate.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents. While certain aspects of conventional technologies have been discussed to facilitate the present disclosure, applicants in no way disclaim these technical aspects, and it is contemplated that the present disclosure may encompass one or more of the conventional technical aspects discussed herein.

DASH as described in International Organization for Standardization/International Electrotechnical Commission (ISO/IEC) document 23009-1:2012(E) entitled "Information technology-Dynamic adaptive streaming over HTTP (DASH)—Part 1: Media presentation description and segment formats," which is incorporated herein by reference, specifies the format of MPD and the segment formats for DASH. A piece of media content may be specified by a MPD that comprises a plurality of segment elements. A MPD may also comprise other elements and attributes programmed to describe information regarding the media content. The MPD may be an Extensible Markup Language (XML) file or some other type of document that describes the media content, such as its various representations (defined below), uniform resource locator (URL) addresses, actual segments, and other characteristics. For example, the media content (e.g. a movie file) may comprise several media components (e.g. audio, video, and text), each of which may have different characteristics that are specified in the MPD. Each media component may comprise a plurality of segments containing the parts of actual media content, and information of the segments may be stored collectively in a single file or individually in multiple files. Each segment may contain a pre-defined byte size (e.g., 1,000 bytes) or an interval of playback time (e.g., 2 or 5 seconds) of the media content. A segment may indicate the minimal individually addressable unit of data that can be downloaded using URL addresses advertised via the MPD.

Media content, such as video/audio content may be encoded as CBR or VBR streams. Encoding media content as CBR streams may have some advantages. For example, the data rate for a CBR stream is rather smooth with small variation in the bitrate. Bitrate of an encoded content in this disclosure refers to the data rate averaged over a segment duration (e.g. kilobytes per second (kbps)). In the context of DASH, the segment duration refers to the length of media time for a segment. As such, the bandwidth (e.g. network bandwidth) required to deliver the CBR streams may be more predictable than the bandwidth needed for VBR streams. Encoding CBR streams may also simplify bandwidth allocation when CBR streams are delivered over a communication channel (e.g. a broadcast system), where multiple programs are multiplexed and each of the programs is allocated with a fixed portion of the total bandwidth. In this case, the number of programs that can be accommodated is a constant, which is determined prior to service operation. Thus, CBR streams may reduce complexity and resource cost when encoding media content.

Although VBR streams may suffer from a wide bitrate range and may be more complex to prepare, VBR streams may have several advantages over CBR streams in the adaptive streaming context. As opposed to CBR streams, VBR encoded streams may permit the amount of output data to vary from one segment to another segment. VBR streams may allocate high bitrates to more complex segments (e.g. fast moving action scenes in a movie) and allocate low bitrates to less complex segments (slow moving scenes in a movie). The ability to allocate different bitrates to different segments may produce a more consistent quality for end users. As such, VBR streams may provide a more uniform and consistent quality than CBR streams for a given average bitrate. Quality within this disclosure may refer to the quality of the media content measured objectively and/or perceived subjectively by the user. Persons of ordinary skill in the art are aware of a variety of techniques that may be used to determine quality. For example, video quality may be measured using objective quality metrics, such as Mean Square Error (MSE), Signal to Noise Ratio (SNR), Peak Signal to Noise Ratio (PSNR), and Structure Similarity (SSIM), subjective quality metrics, such as Mean Opinion Score, or a combination of both types of metrics.

Additionally, VBR streams may have higher compression efficiency than CBR streams, which may reduce the amount of storage for the media content. VBR streams may maintain the higher compression efficiency while producing a consistent quality. For a CBR stream to meet a target quality, the bitrate for the CBR stream, which is also the peak bitrate, may be selected such that the actual quality for the more complex scenes meets the target quality. However, the less complex scenes may have an actual quality much higher than the target quality because the bitrate for the CBR stream is consistent. Therefore, CBR streams may waste network bandwidth and may lower the compression efficiency. In contrast, VBR streams may maintain the same quality for both the complex scenes and less complex scenes and vary the bitrate for the different scenes. For example, the peak bitrate may be applied to the more complex scenes, while the bitrates for less complex scenes may be much lower. As a result, the average bitrate of the VBR stream may be lower than the bitrate of the CBR stream when encoding media content with the same target quality. The lower average bitrates for VBR streams may be used to optimize overall network bandwidth usage.

Another benefit for encoding media content into VBR streams is that VBR streams may increase the flexibility of DASH. For example, recall that CBR streams have a constant bitrate. When network congestion reduces network bandwidth, a DASH client may need to switch to a different representation with a lower bitrate. The switch to a different representation may produce a lower quality. Conversely, VBR streams may have bitrates that vary depending on the complexity of the segments. In instances when a reduction in network bandwidth occurs, if VBR streams that have lower bitrates (e.g. less complex segments) are being transported over the network at that time, then a DASH client may not need to switch to another representation. Hence, the switching of representations in DASH may depend on the time-variant bandwidth available, the time-variant bitrates, and the quality of the segments. Table 1 provides a summary of the advantages and disadvantages of CBR and VBR:

TABLE 1

|  | CBR | VBR |
|---|---|---|
| Advantages | Nearly constant bitrate<br>Easy for bandwidth allocation<br>Short encoding delay<br>Simple switching only relies on available bandwidth<br>Uniform duration segments | High compression rate<br>Storage saving, high caching efficiency<br>Consistent quality throughout a stream<br>Flexible switching (increased possibility when bandwidth changes) |
| Disadvantages | Low compression rate<br>Storage waste, low caching efficiency<br>Variable quality in one stream<br>Non-flexible switching | Variable bitrate with potentially high peak bitrate<br>Non-uniform duration segments<br>Long encoding delay<br>Complicate switching decision |

Disclosed herein are at least one method, apparatus, and system that support VBR streams for adaptive streaming, such as DASH. An indication within the MPD may be used to indicate the encoding mode (e.g. either VBR or CBR) for a media stream, and may provide detailed bitrate information of segments when the media stream is encoded as a VBR stream. In one embodiment, the MPD may provide a bitrate for each segment of the VBR stream. The segment bitrates for a VBR stream may be signaled to a client using a "Segment-Bandwidth" element, derived using a "sidx" box or index segment, and/or specified in one or more index segment files or one or more separate files. The "SegmentBandwidth" element in the MPD may indicate the bandwidth required for delivery of segments in a timely fashion, possibly with a buffering requirement. The MPD may also implement length coding to describe consecutive segments sharing the same value of bandwidth. Although the disclosure may specifically reference supporting VBR streams in DASH, the disclosure may be applied to other adaptive streaming protocols, such as HTTP Live Streaming (HLS) or Internet Information Services (IIS) Smooth Streaming. For example, the MPD may also be referenced as a "playlist" and/or "manifest" in other adaptive streaming protocols. Moreover, the "SegmentBandwidth" element may also be referred to using other names, such as "SegmentBitrate."

FIG. 1 is a schematic diagram of an embodiment of a media streaming scheme 100 where embodiments of the present disclosure may operate. Media streaming scheme 100 may be implemented to deliver media content from a HTTP server 120 to a streaming client 110. For example, the media streaming scheme 100 may be a DASH or other type of streaming scheme, such as HLS or IIS Smooth Streaming. The streaming client 110 may be a stand-alone device, a program or application implemented in an operating system of a user device, and/or a web client accessed in a web platform. The media content stored in the HTTP server 120 may be generated or prepared by a streaming media preparation unit 130. The media preparation unit 130 may be located within the HTTP server 120, an end user, a network element, and/or elsewhere (e.g., in a content provider site). The HTTP server 120 may be part of a content provider network or may be a network element in a content distribution network (CDN). The media content may be generated at least in part by one or more content providers and then transmitted to a CDN network element. The media content in the HTTP server 120 may comprise a MPD and a plurality of segments. Note that, if desired, the MPD and the segments may be stored in different servers and retrieved by the streaming client 110 from different servers. In addition, a HTTP server 120 described herein merely serves as an example of server. Embodiments disclosed herein may also be implemented in an origin server, web server, or any other suitable type of server in addition to the HTTP server 120. Additionally, more than one HTTP server 120 and/or other suitable types of servers may store media content and may be connected to a CDN.

In the media streaming scheme 100, the streaming client 110 may send a request to the HTTP server 120 for media content. In response, the HTTP server 120 may first use a MPD delivery function 140 to deliver a MPD to the streaming client 110. The MPD may be delivered using HTTP, HTTP secure (HTTPS), email, Universal Serial Bus (USB) drive, broadcast, or any other transport. By parsing the MPD, the streaming client 110 may learn information regarding the media content, such as the timing of the program, the availability of media content, the media types, resolutions, minimum and maximum bandwidths, the existence of various encoded alternatives of multimedia components, the accessibility features and the required digital right management (DRM), the location of each media component on the network, and other characteristics of the media content and delivery environment. Other embodiments of media streaming scheme 100 may deliver media content information using a playlist, manifest, and/or types of data to describe information regarding the media content.

Using the media content and delivery environment information, the streaming client 110 may select the appropriate encoded representation or combination of representations and start streaming of the media content by fetching segments using HTTP Get requests. The HTTP server 120 may use a segment delivery function to deliver the segments to the streaming client 110. Note that the streaming client 110 may download segments from a plurality of HTTP servers 120 (e.g. to maximize usage of network bandwidth). The segments may also be stored into one or more HTTP servers 120 connected to a CDN. The streaming client 110 may render the downloaded media appropriately so as to provide streaming service to a user of the streaming client 110. Although the streaming client 110 may obtain the segments based from locations specified by the URL addresses within the MPD, the segment may alternately be stored in a HTTP cache 150 (e.g., in the HTTP server 120 or a CDN network element) to improve the efficiency of streaming client's 110 receipt.

If buffering is needed, after appropriate buffering to allow for network throughput variations, the streaming client 110 may continue to download subsequent segments while monitoring bandwidth fluctuations of the network. Depending on measurements the streaming client 110 conducts or notifications it receives, the streaming client 110 may adaptively adjust streaming to the available bandwidth by downloading segments of different representations (e.g., with a lower or higher bitrate) to maintain an adequate buffer.

Figure 2:
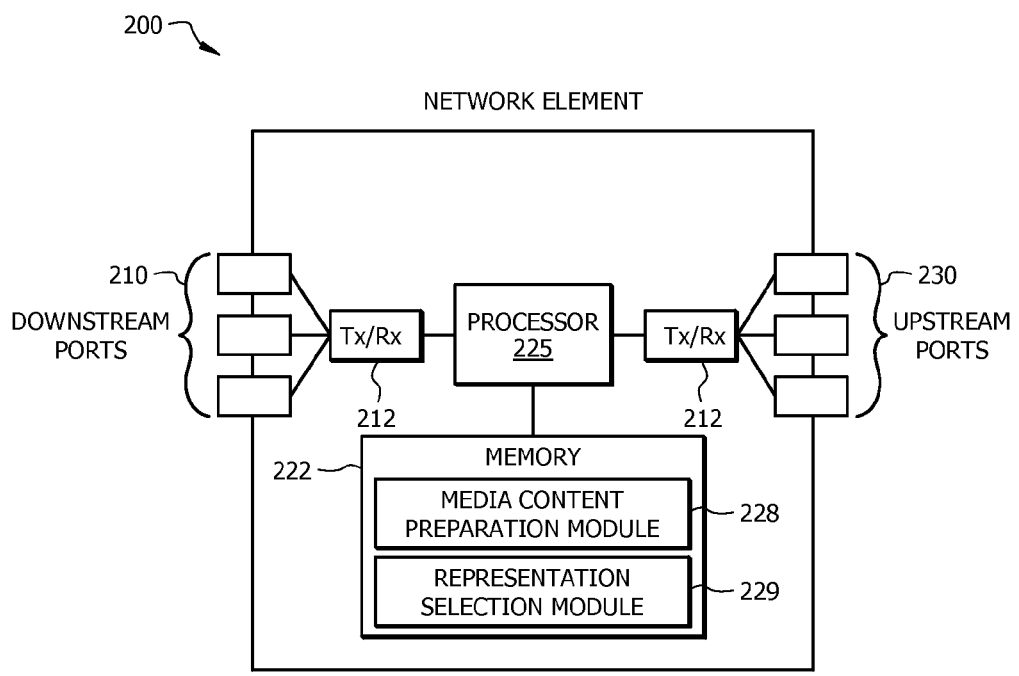
FIG. 2 is a schematic diagram of an embodiment of a network element, which may be any device that transports and processes data through a network.

At least some of the features/methods described in the disclosure may be implemented in a network element. For instance, the features/methods of the disclosure may be implemented using hardware, firmware, and/or software installed to run on hardware. The network element may be any device that transports data through a network, e.g., a switch, router, bridge, server, client, etc. FIG. 2 is a schematic diagram of an embodiment of a network element 200, which may be any device that transports and processes data through a network. For instance, the network element 200 may be any apparatus used to prepare media content and/or receive media content. For example, network element 200 may be streaming client 110 or the HTTP server 120 shown in FIG. 1. The network element 200 may also be configured to implement or support MPD generation and processing described in methods 300 and 400.

The network element 200 may comprise one or more downstream ports 210 coupled to a transceiver (Tx/Rx) 212, which may be transmitters, receivers, or combinations thereof. The Tx/Rx 212 may transmit and/or receive frames from other nodes via the downstream ports 210. Similarly, the network element 200 may comprise another Tx/Rx 212 coupled to a plurality of upstream ports 230, wherein the Tx/Rx 212 may transmit and/or receive frames from other nodes via the upstream ports 230. The downstream ports 210 and/or upstream ports 230 may include electrical and/or optical transmitting and/or receiving components.

A processor 225 may be coupled to the Tx/Rx 212 and be configured to process the frames and/or determine which nodes to send the frames. The processor 225 may comprise one or more multi-core processors and/or memory modules 222, which may function as data stores, buffers, etc. The processor 225 may be implemented as a general processor or may be part of one or more application specific integrated circuits (ASICs) and/or digital signal processors (DSPs). Although illustrated as a single processor, the processor 225 is not so limited and may comprise multiple processors. The processor 225 may be configured to implement any of the schemes described herein, including methods 300 and 400 as described in FIGS. 3 and 4, respectively.

Memory module 222 may be coupled to the processor 225 and may be non-transitory mediums configured to store various types of data. Memory module 222 may comprise memory devices including secondary storage, read only memory (ROM), and random access memory (RAM). The secondary storage is typically comprised of one or more disk drives, solid-state drives (SSDs), and/or tape drives and is used for non-volatile storage of data and as an over-flow data storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and the RAM is typically faster than to the secondary storage.

The memory module 222 may be used to house the instructions for carrying out the system and methods described herein, e.g., as streaming client 110, as a HTTP server 120, etc. In one embodiment, the memory module 222 may comprise a media content preparation module 228 that may be implemented on the processor 225. Alternately, the media content preparation module 228 may be implemented directly on the processor 225. The media content preparation module 228 may be configured to prepare media content and generate the MPD used to provide media content information for a client. Preparing media content and generating the MPD will be discussed in more detail in FIG. 3. In another embodiment, the memory module 222 may comprise a representation selection module 229 that may parse the MPD to select which representation to use for downloading a segment. The selection of representation for downloading a segment will be discussed in more detail in FIG. 5.

It is understood that by programming and/or loading executable instructions onto the network element 200, at least one of the processor 225, the cache, and the long-term storage are changed, transforming the network element 200 in part into a particular machine or apparatus, e.g., a multi-core forwarding architecture, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Figure 3:
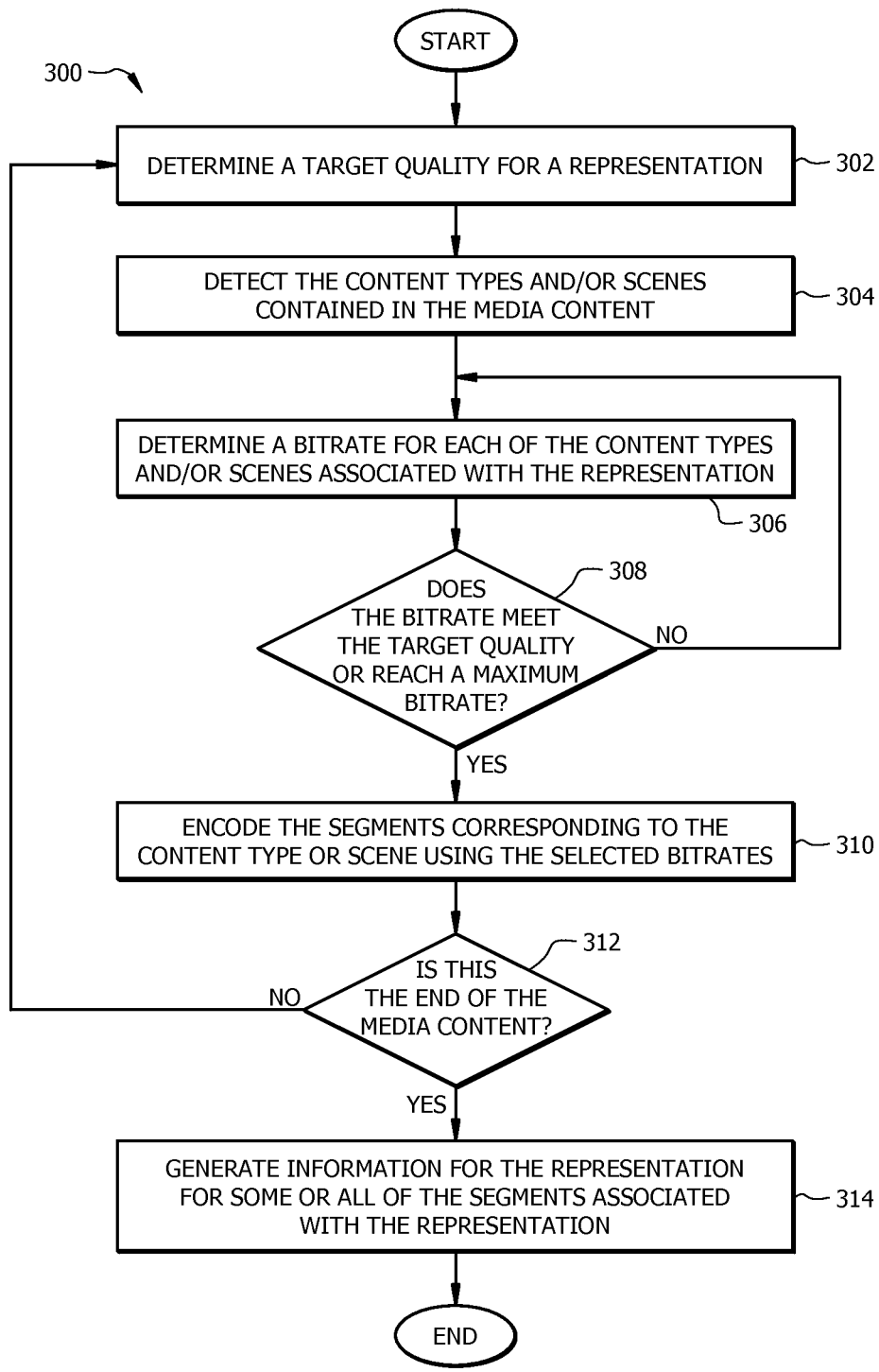
FIG. 3 is a flowchart of an example embodiment of a method used for media content preparation for VBR streams.

FIG. 3 is a flowchart of an example embodiment of a method 300 used for media content preparation for VBR streams. Method 300 may be implemented by a HTTP server, end user, network element, and/or any other type of device that prepares media content for streaming. Using FIG. 1 as an example, method 300 may be implemented in the streaming media preparation 130. Method 300 may be performed for one or more representations associated with a media content. Description information for each of the representations may be located within a MPD and may indicate whether the media content is encoded as CBR streams or VBR streams. Additionally, the description information for each of the representations may include the segment level bitrate and quality information when the media content is encoded. After encoding the media content, the segments and/or MPD may be transmitted and stored on one or more servers (e.g. HTTP servers) and/or other network elements. Method 300 may be used to provide about a constant quality level by determining different bitrates for different segments that meet a target quality level determined for a representation. Constant quality level may be defined in this disclosure as the target quality within a tolerant variation range. For example, target quality level of 45 decibel (dB) with a ±2 dB tolerant variation range (e.g. 43 dB to 47 dB) using the PSNR metric may be considered a constant quality level for video media. Each of the representations may be associated with a different target quality.

Method 300 may start to encode the media content into a representation with variable segment bitrates by moving to block 302 to determine a target quality for a representation used to encode segments corresponding to the representation. The target quality may be determined by a user or some other operator that determines the parameters used to encode the media content. The target quality may be a parameter supplied by the user or based on other user provided input parameters. The target quality may indicate the target quality of the media content that can be perceived by a user and/or based on objective measurements. Representation will be discussed in more detail in FIG. 4.

From block 302, method 300 may proceed to block 304 and subsequently detect the content types and/or scenes associated with the representation. A media content may comprise scenes of different motion level and spatial complexity, and passages of different content type, such as sports, news, and drama. Some of the content types and/or scenes may be simple and easier to encode, while other content types and/or scenes may be more complex and more difficult to encode. Method 300 may then continue to block 306 and determine a bitrate for each content type and/or scene associated with the representation. Method 300 may allocate higher bitrates for complex scenes, while lower bitrates may be allocated for simple or less complex scenes.

Afterwards, method 300 may then move to block 308 and determine whether the bitrate meets the target quality or reaches a maximum bitrate. In some instances, a restriction may exist for the maximum bitrate. When the bitrate used to encode the media content reaches the maximum bitrate, the maximum bitrate is used to encode the media content even if the target quality cannot be met. If method 300 determines that the selected bitrate does not meet the target quality or reaches the maximum bitrate, then method 300 may return back to block 306. Method 300 may use blocks 306 and 308 to determine the lowest bitrate for each component type/scene that meets the target quality set for the representation. Alternatively, if method 300 determines that the selected bitrate meets the target quality, method 300 may then proceed to block 310 and encode the segments corresponding to the representation using the selected bitrate. As such, method 300 may encode the segments as VBR streams with different bitrates.

Method 300 may then move to block 312 to determine if the encoding has reached the end of the media content. If method 300 has not reached the end of encoding the media content, then method 300 may move back to block 302. If method 300 reaches the end of encoding the media content, then method 300 may move to block 314. At block 314, method 300 may generate information for the representation for some or all of the segments associated with the representation. The representation may have variable segment bitrates that produce about a constant quality level. The information pertaining to the representation with variable segment bitrates may be provided within the MPD that comprises segment information that indicates a constant quality and varying bitrates for the segments. Some or all of the segments (e.g. initialization segments and media segments) may have the same segment duration (e.g. 10 seconds in length), while others may vary in duration. Furthermore, method 300 may also group consecutive segments within the MPD that share the same or about the same bitrate into groups using run-length coding. Grouping consecutive segments using run-length coding will be discussed in more detail below.

Figure 4:
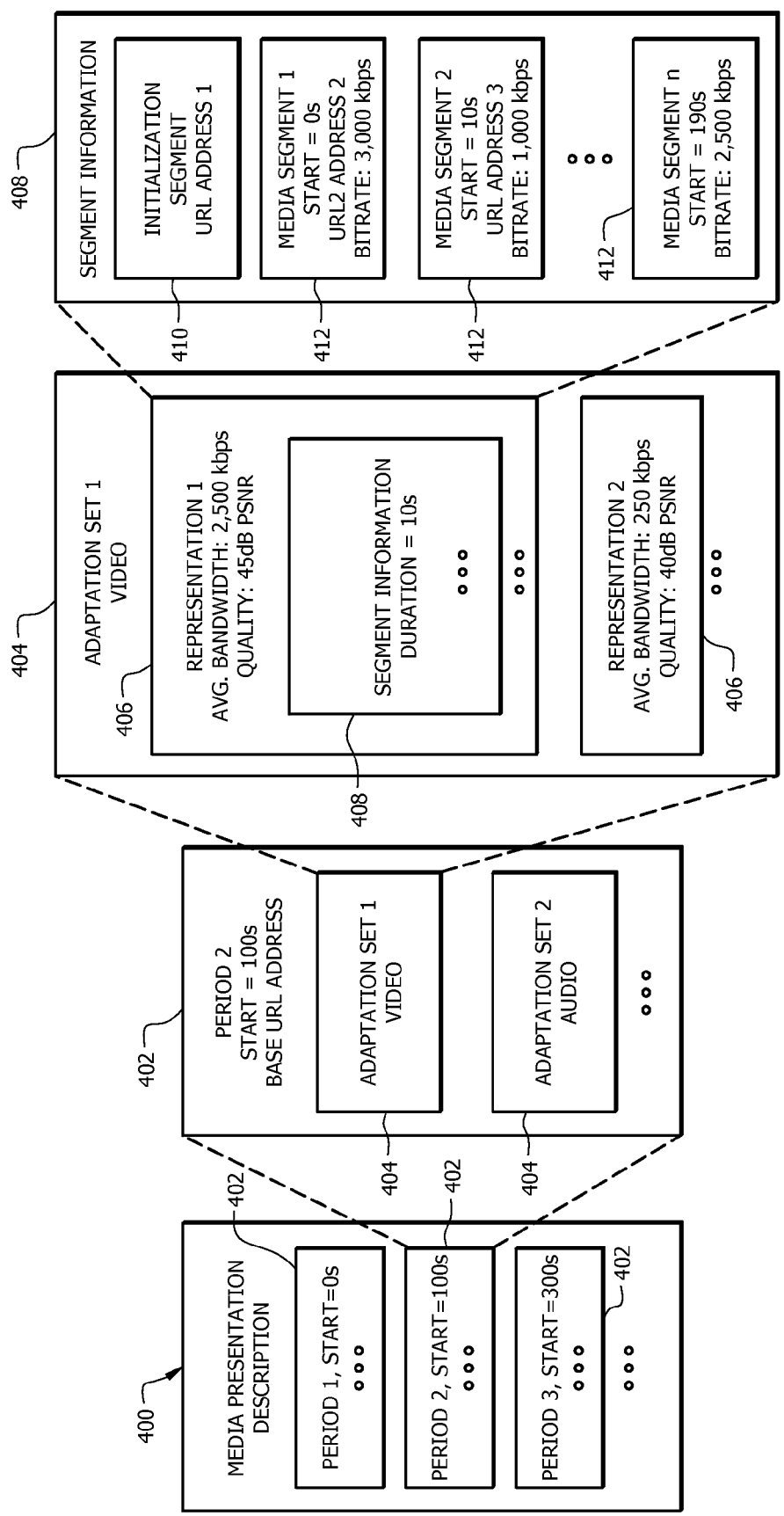
FIG. 4 is a schematic diagram of an embodiment of a media presentation description (MPD).

FIG. 4 is a schematic diagram of an embodiment of a MPD 400. Recall that MPD 400 may be an XML file or some other type of document that describes the media content. The MPD may include representations, URL addresses, and other characteristics used to describe the media content. The MPD 400 may comprise one or more period elements 402 that correspond to intervals (e.g. time intervals) of the media content. Each of the period elements 402 may correspond to time-limited subsets of the media content, which may also be referred to as the media presentation in this disclosure. A contiguous sequence of all of the period elements 402 may form the media content or media presentation. In FIG. 4, the MPD 400 may comprise period element 1-3 402. Period element 1 402 may correspond to the media content starting at about zero seconds and ending before period element 2 402 (e.g. about 99 seconds); period element 2 402 may correspond to the interval starting at about 100 seconds and ending before period element 3 402 (e.g. about 299 seconds), and period element 3 402 may correspond to the interval starting at about 300 seconds.

Each of the period elements 402 may be further divided into one or more adaptation sets 404. Adaptation set elements 404 may represent a set of interchangeable encoded versions of one or more media content components. A media content component may be a media content type, such as audio, video, or text, encoded within a media stream (e.g. VBR stream). In FIG. 4, period element 2 402 may comprise adaptation set element 1 404 and adaptation set element 2 404. Adaptation set element 1 404 may have a video media content type, while adaptation set element 2 404 may have an audio media content type. If other material types are available, such as captions or audio descriptions, each of the different material types may have its own separate adaptation set element 404. Other embodiments may have adaptation set elements 404 with more than one media content type (e.g. both video and audio).

Each of the adaptation set elements 404 may further comprise a plurality of representation elements 406. The representation elements 406 may describe a deliverable encoded version of one or more media content components. For example, representation element 1 406 may be a 2.5 megabits (e.g. 2,500 kilobits) per second 720p Advanced Video Coding (AVC) video. Any of the representation elements 406 within an adaptation set element 404 may deliver the media content components associated with the adaptation set element 404. FIG. 4 illustrates that adaptation set element 1 404, which represents a video media content type, may comprise representation element 1 406 and representation element 2 406. Either representation element 1 406 or representation element 2 406 may be used to deliver the video media content type for period element 2 402 (e.g. 100 seconds-299 seconds). In one embodiment, some and/or all of the representations may have varying average bitrates (bandwidth) used to encode segments. For example, in FIG. 4, representation element 1 406 may have an average bitrate (bandwidth) of about 2,500 kbps, while representation element 2 406 may have an average bitrate (bandwidth) of about 250 kbps. Additionally, the representation elements 406 may represent different media content quality. In FIG. 4, representation element 1 406 may have a quality level of about 45 dB in PSNR, while representation element 2 406 may have a quality level of about 40 dB in PSNR.

The MPD may include information pertaining to the encoded media content. Recall that in FIG. 3, method 300 may generate the representations with variable segment bitrates. Each of the representations may be encoded to provide an indication that the representation is encoded as one or more VBR streams. Table 2 provides the semantics of the representation element 406 generated for the MPD for indicating whether the representation is encoded using CBR or VBR:

TABLE 2

| Element or Attribute Name | Use | Description |
| --- | --- | --- |
| Representation | | This element contains a description of a Representation. |
| ... | | |
| @bandwidth | O | If present, it indicates the representation is of proximate constant bitrate. The parameter is explained as follows:<br>Consider a hypothetical constant bitrate channel of bandwidth with the value of this attribute in bits per second (bps). Then, if the Representation is continuously delivered at this bitrate, starting at any SAP that is indicated either by @startWithSAP or by any Segment Index box, a client can be assured of having enough data for continuous playout providing playout begins after @minBufferTime * @bandwidth bits have been received (i.e. at time @minBufferTime after the first bit is received).<br>For dependent Representations this value shall specify the minimum bandwidth as defined above of this Representation and all complementary Representations.<br>If not present, it indicates the representation is of variable segment bitrates. The detailed bitrates are given by SegmentBandwidth elements in SegmentBase element. |
| @qualityRanking | O | Specifies a quality ranking of the Representation relative to other Representations in the same Adaptation Set. Lower values represent higher quality content. If not present then no ranking is defined. |
| ... | | |

Legend:
For attributes:
M = Mandatory,
O = Optional,
OD = Optional with Default Value,
CM = Conditionally Mandatory.
For elements:
<minOccurs> ... <maxOccurs> (N = unbounded)
Elements are bold;
attributes are non-bold and preceded with an @,
List of elements and attributes is in italics bold referring to those taken from the Base type that has been extended by this type.

In Table 2, when the representation element 406 includes the presence of the attribute "@bandwidth," then the representation is encoded as one or more CBR streams. When the representation element 406 does not disclose the attribute "@bandwidth" (e.g. the attribute "@bandwidth" is not present), then the representation is encoded in VBR, which can be viewed as one or more temporally concatenated CBR streams of different bitrates.

Each of the representation elements 406 may comprise a segment information element 408 that provides segment information such that the segments for the media content may be accessed through a HTTP GET request. In one embodiment, the segment information element 408 may be a "SegmentBase" element. The segment information element 408 may further comprise an initialization segment element 410 and a plurality of segment elements 412. The initialization segment element 410 may include initialization information for accessing the representation. The segment elements 412 may indicate information for the corresponding segment downloaded from a HTTP server or other device. The segment elements 412 may include bitrate information (e.g. "SegmentBandwidth" element) used to encode the segments within VBR streams.

Segment elements 412 may indicate the bitrates for the encoded segments. For example, segment element 1 412 may indicate that the bitrate for the actual segment 1 may be about 3,000 kbps, while the segment element 2 412 may indicate the bitrate for the actual segment 2 may be about 1,000 kbps. In another embodiment, segment element 1 412 and segment element 2 412 may be grouped together using a run-length coding when segments 1 and 2 are encoded with the same bitrates. As shown in FIG. 4, segment element 1 412 and segment element 2 412 indicate that the actual segments 1 and 2 are encoded as consecutive segments. In other words, the actual segment 2 sequentially follows the actual segment 1 in the media presentation. When segment element 1 412 and segment element 2 412 indicate the same bitrate and/or bandwidth value (e.g. both 2,500 kbps), then run-length coding may group the two segment elements 412 as one segment element 412. The grouping of consecutive segments with the same or similar bitrates and/or bandwidth may compact the size of the MPD used to describe the media content.

In one embodiment, when the representation is encoded as a VBR stream, then the segment bitrates of the VBR stream may be expressed in a "SegmentBandwidth" element within the "SegmentBase" element (e.g. segment information element 408) in the MPD. The "SegmentBandwidth" element may provide the bitrate and/or bandwidth of one or more segments when the representation is VBR encoded. Table 3 provides the semantics of the "SegmentBandwidth" element contained in segment information element 408, which is in a representation element 406 generated for the MPD:

TABLE 3

| Element or Attribute Name | Use | Description |
|---|---|---|
| SegmentBandwidth | 1 ... N | Specifies a group of Segment with approximate constant bitrate. |
| @bandwidth | O | Specifies the bandwidth for consecutive segments of approximate same bitrate in kbps. It is obtained with the size of a Segment averaged over its media duration then rounded up to a multiple of an increment. For dependent Representations this value shall specify the minimum bandwidth of corresponding segments as defined above from this Representation and all complementary Representations. |
| @n | OD default: 0 | Specifies the number of segment(s) contained in the element. The first segment contained in the element is the one next to the last segment contained in the preceding SegmentBandwidth element. In case this is the first SegmentBandwidth, the first segment is the first segment of the Representation. This value is zero-based (e.g. a value of three means four segments in the contiguous series). |

Legend:
For attributes:
M = Mandatory,
O = Optional,
OD = Optional with Default Value,
CM = Conditionally Mandatory.
For elements:
<minOccurs> ... <maxOccurs> (N = unbounded)
Elements are bold;
attributes are non-bold and preceded with an @.

In Table 3, the "SegmentBandwidth" element may comprise a "@bandwidth" attribute that indicates the common bitrate and/or bandwidth of one or more segments covered within the "SegmentBandwidth" element. The "@bandwidth" attribute within the "SegmentBandwidth" element may be expressed in kbps. The bitrate and/or bandwidth of a segment may be calculated by dividing the size of a segment (e.g. kilobytes) by the media duration (e.g. seconds) for the segments. The calculated bitrate and/or bandwidth may be rounded up to the nearest kbps or to a multiple of an increment. The selection of the increment may be network dependent.

The "SegmentBandwidth" element may further comprise a "@n" attribute that indicates the number of segments covered in the element. The "@n" attribute may be optional and segments referenced within the "SegmentBandwidth" element may have about the same bitrate and/or bandwidth. The "@n" attribute value may be zero-based such that the "@n" attribute value may have a default value of zero when the "@n" attribute is not present. The default value of zero may indicate that the "SegmentBandwidth" element may comprise a single segment. Also, because "SegmentBandwidth" elements may order segments in a representation sequentially in time, the "SegmentBandwidth" element may not include a start number for the segments. Table 4 provides XML syntax that may be used to represent the "SegmentBandwidth" element within a MPD XML file:

TABLE 4

```
<!-- Segment Bitrate -->
<xs:complexType name="SegmentBandwidthType">
    <xs:complexType>
        <xs:attribute name="b" type="xs:unsignedInt"/>
        <xs:attribute name="r" type="xs:unsignedInt" use="optional"
```

TABLE 4-continued

```
        default="0"/>
    </xs:complexType>
</xs:complexType>
```

The "@n" attribute may be used to implement run-length coding that compacts the MPD. The "@n" attribute may describe a sequence of contiguous segments that share about the same bitrate and/or bandwidth. The scale of the "@bandwidth" attribute for the "SegmentBandwidth" element may vary in size. For example, the scale of the "@bandwidth" attribute may range from about one kbps to about tens of kbps. The scale of the "@bandwidth" attribute may depend on a variety of factors that include, but are not limited to the network environment of the client works, the error tolerance when measuring and estimating the available bandwidth, and the granularity of the bandwidth allocated to a device. The larger the scale used for the "@bandwidth" attribute, the higher the compression efficiency of the MPD when using run-length coding.

In one embodiment, the "SegmentBandwidth" element can be included within the "SegmentBase" element as a separate element. In another embodiment, the "SegmentBandwidth" element may be integrated into an existing element within the "SegmentBase" element, such as the "SegmentTimeline" element. Integrating the "SegmentBandwidth" element with another element may produce a more compact MPD because the "@bandwidth" attribute may be added to an existing element. Table 5 provides the semantics of the "SegmentTimeline" element that integrates "SegmentBandwidth" element:

TABLE 5

| Element or Attribute Name | Use | Description |
|---|---|---|
| SegmentTimeline | | Specifies the Segment timeline information |
| SegmentBandwidth | 1 ... N | |
| @bandwidth | | |
| S | 1 ... N | Specifies Segment start time and duration for a contiguous sequence of segments of identical durations. The textual order of the S elements must match the indexed (and thus time) order of the corresponding Segments. |
| @t | O | Specifies the MPD start time, in @timescale units, the first Segment in the series starts relative to the beginning of the Period. The value of this attribute must be equal to or greater than the sum of the previous S element earliest presentation time and the sum of the contiguous Segment durations. If the value of the attribute is greater than what is expressed by the previous S element, it expresses discontinuities in the timeline. If not present then the value shall be assumed to be zero for the first S element and for the subsequent S elements, the value shall be assumed to be the sum of the previous S element's earliest presentation time and contiguous duration (i.e. previous S@t + @d * (@r + 1)). |
| @d | M | Specifies the Segment duration, in units of the value of the @timescale. |
| @r | OD default: 0 | Specifies the repeat count of the number of following contiguous Segments with the same duration expressed by the value of @d. This value is zero-based (e.g. a value of three means four Segments in the contiguous series). |

Legend:
For attributes:
M = Mandatory,
O = Optional,
OD = Optional with Default Value,
CM = Conditionally Mandatory.
For elements:
<minOccurs> ... <maxOccurs> (N = unbounded)
Elements are bold;
attributes are non-bold and preceded with an @.

In Table 5, "@bandwidth" attribute corresponds to the "@bandwidth" attribute in the "SegmentBandwidth" element as described in Table 3. The number of segments sharing "@bandwidth" attribute (e.g. "@n" attribute the "SegmentBandwidth" element) may be the sum of the value of the "@r" attributes for the S elements under the "SegmentBandwidth" element. When integrating the "SegmentBandwidth" element into the "SegmentTimeline" element, representations that include the "SegmentTimeline" element may not be ignored by a client when parsing a MPD.

In another embodiment, when the representation is encoded as a VBR stream, instead of expressing the segment bitrates of the VBR stream using a "SegmentBandwidth" element, the bitrate of each segment and/or sub-segment may be derived using 'sidx' box or index segment. The 'sidx' box and index segment, as described in the ISO/IEC document 23009-1:2012(E), may be requested by clients for subsequent segments from different representations. The clients may request the 'sidx' box and index segment before selecting the representation to download the subsequent segment. The additional HTTP requests may cause more round trip delays.

In another embodiment, the segment bitrates of the VBR stream may be expressed using one more index segments and/or one or more separate files. The bitrates and/or related segment quality information (SQI) of segments and/or media sub-segments may be specified in one or more index segments and/or one or more separate files for easy retrieval. The signalling bitrate information and/or SQI may allow a client to determine from the MPD that bitrate information and/or SQI may be found in the index segment(s) or file(s). When a client receives the signalling bitrate information and/or SQI, the client may fetch the index segment(s) first to get the bitrate information and/or SQI to perform dynamic adaptation. Consequently, a client may obtain the bitrate information and/or SQI without retrieving the actual segments.

Figure 5:
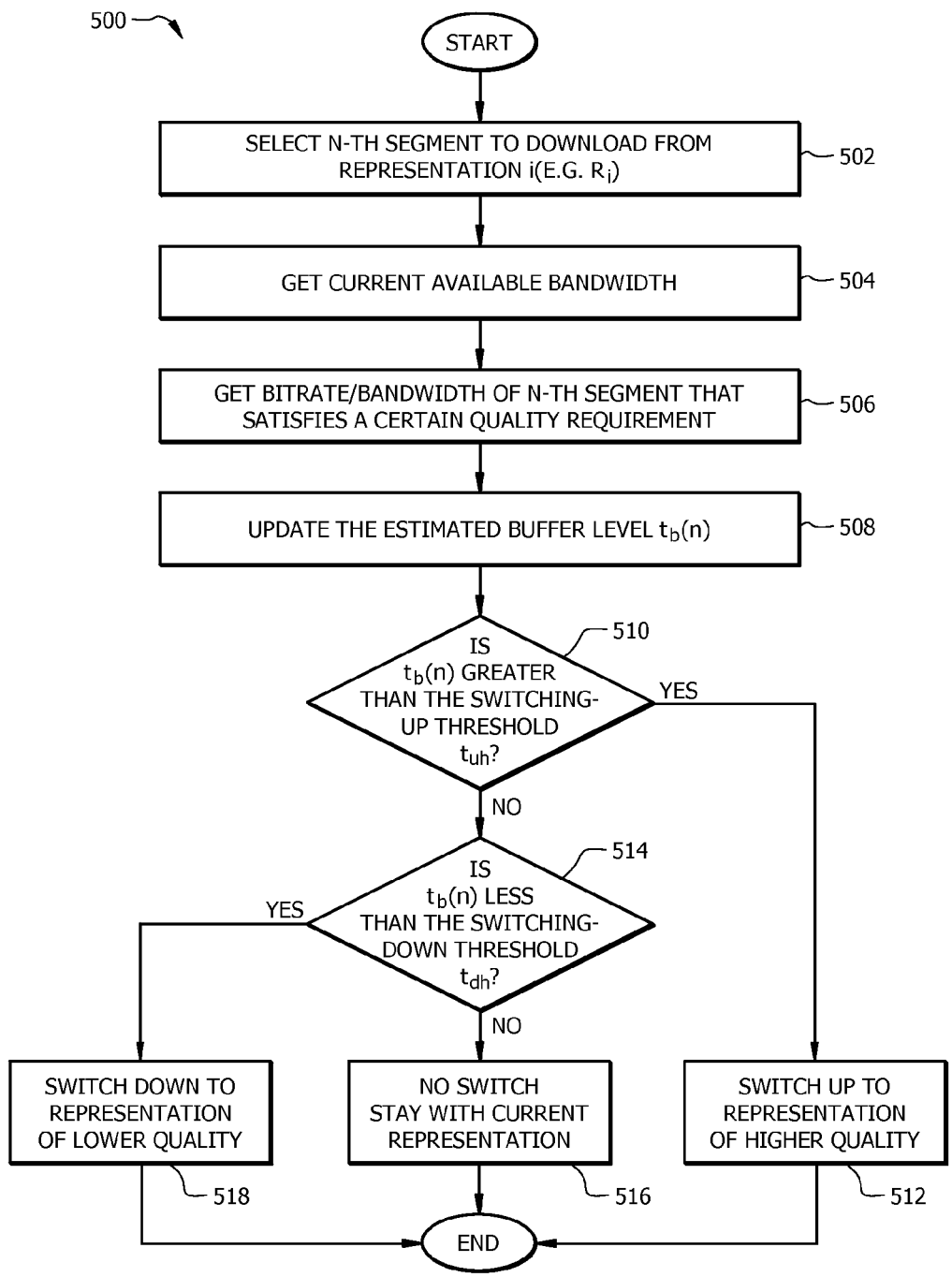
FIG. 5 is a flowchart of an embodiment of a method used for selecting and switching representations when downloading segments.

FIG. 5 is a flowchart of an embodiment of a method 500 used for selecting and switching representations when downloading segments for a media content. Specifically, method 500 may select and switch the representations used to download segments of the media content based on quality. Method 500 may be implemented at any type of streaming client, such as a DASH client. After the client receives the MPD and parses through the information within the MPD, the client may generate a segment list of the segments the streaming client may download. Method 500 may select a segment of a representation to download based on its bitrate and quality information when media content is encoded using VBR streams. Method 500 may switch to and stay with representation to request a segment that meets a certain quality level. Recall that the bitrate of the representation may change and/or the available network bandwidth may change over time. As such, even when the available network bandwidth may be less than the bitrate of a segment of a representation that satisfies a quality level, method 500 may attempt to switch to the representation and to download the segment depending on the buffered media data.

Method 500 may start at block 502 and select the n-th segment to download from representation i ($R_i$). The n-th segment refers to the segment that method 500 is currently going to download from one or more HTTP servers and/or HTTP caches. The (n−1) segment may indicate the previous segment downloaded by method 500, while the (n+1) segment may indicate the next segment downloaded by method 500. In one embodiment, method 500 may download the segments within $R_i$ in a temporal sequential order. For example, the (n−1) segment may include the media presentation for the time period of about zero to five seconds, while the n-th segment may include the media presentation for the time period of about six to eleven seconds, and the (n+1) segment may include the media presentation for the time period of about 12 to 17 seconds.

Afterwards, method 500 may move to block 504 to obtain the current available bandwidth of the network and/or connection(s) that may be used to obtain the n-th segment from one or more HTTP servers and/or HTTP caches. As discussed earlier, the current available bandwidth of the network and/or connection(s) may change over time, and thus method 500 may perform block 504 to obtain a more recent measurement of the current available bandwidth. Once method 500 completes block 504, method 500 may continue to block 506 and obtain the bitrate and/or bandwidth of the n-th segment that satisfies a certain quality requirement. In one embodiment, the quality requirement may be set by the client and may represent a minimum quality level (e.g. the lower end of the acceptable lower quality range). In such instances, the n-th segment from $R_i$ may have a quality level greater than the quality requirement (e.g. minimum quality level).

To evaluate the influence of downloading each segment on the buffered levels, method 500 may continue to block 508 and update the estimated buffer level $t_b(n)$. Buffer level $t_b(n)$ may indicate the actual value of the client buffer fullness measured at a time after downloading the n-th segment. In one embodiment, method 500 may estimate the buffer level $t_b(n)$ using equation 1:

$$t_b(n) = t_b(n-1) + t_s(n) - b_s(i,n)/b_a(n) * t_s(n) \quad (1)$$

Buffer level $t'_b(n)$ may be a variable that indicates the estimation of the client buffer fullness calculated at a time before the n-th segment is downloaded. Buffer level $t_b(n-1)$ may be a variable that indicates the buffered media time at a time that segment n−1 has been downloaded. The $t_s(n)$ variable may be used to denote the media duration (e.g. seconds) of the n-th segment. The $b_s(i, n)$ variable may denote the bitrate and/or bandwidth of segment S(i, n) (e.g. kbps), which refers to the n-th segment from $R_i$ obtained in block 506. The $b_a(n)$ variable may denote the current available bandwidth obtained in block 504.

Method 500 may move to block 510 and compare $t_b(n)$ with a switching-up threshold $t_{uh}$. At block 510, if $t_b(n)$ is greater than the switching-up threshold $t_{uh}$, then method 500 may move to block 512 to switch up to a representation of higher quality. If at block 510 method 500 determines $t_b(n)$ is not greater than (e.g. less than or equal to) $t_{uh}$, method 500 may proceed to block 514. At block 514, method 500 may determine whether $t_b(n)$ is less than the switching-down threshold $t_{dh}$. When method 500 determines that $t_b(n)$ is less than $t_{dh}$, then method 500 may move to block 518 and switch down to a representation of a lower quality. Otherwise, at block 514, method 500 may move to block 516 when $t_b(n)$ is not less than (e.g. greater than or equal to) $t_{dh}$. At block 516, method 500 may not switch and may stay with the current selected representation. The switching-up threshold $t_{uh}$ and the switching-down threshold $t_{dh}$ may be a parameter set by the user or operator that provide the service or may be dynamically derived based on the monitoring of the network throughput.

Figure 6:
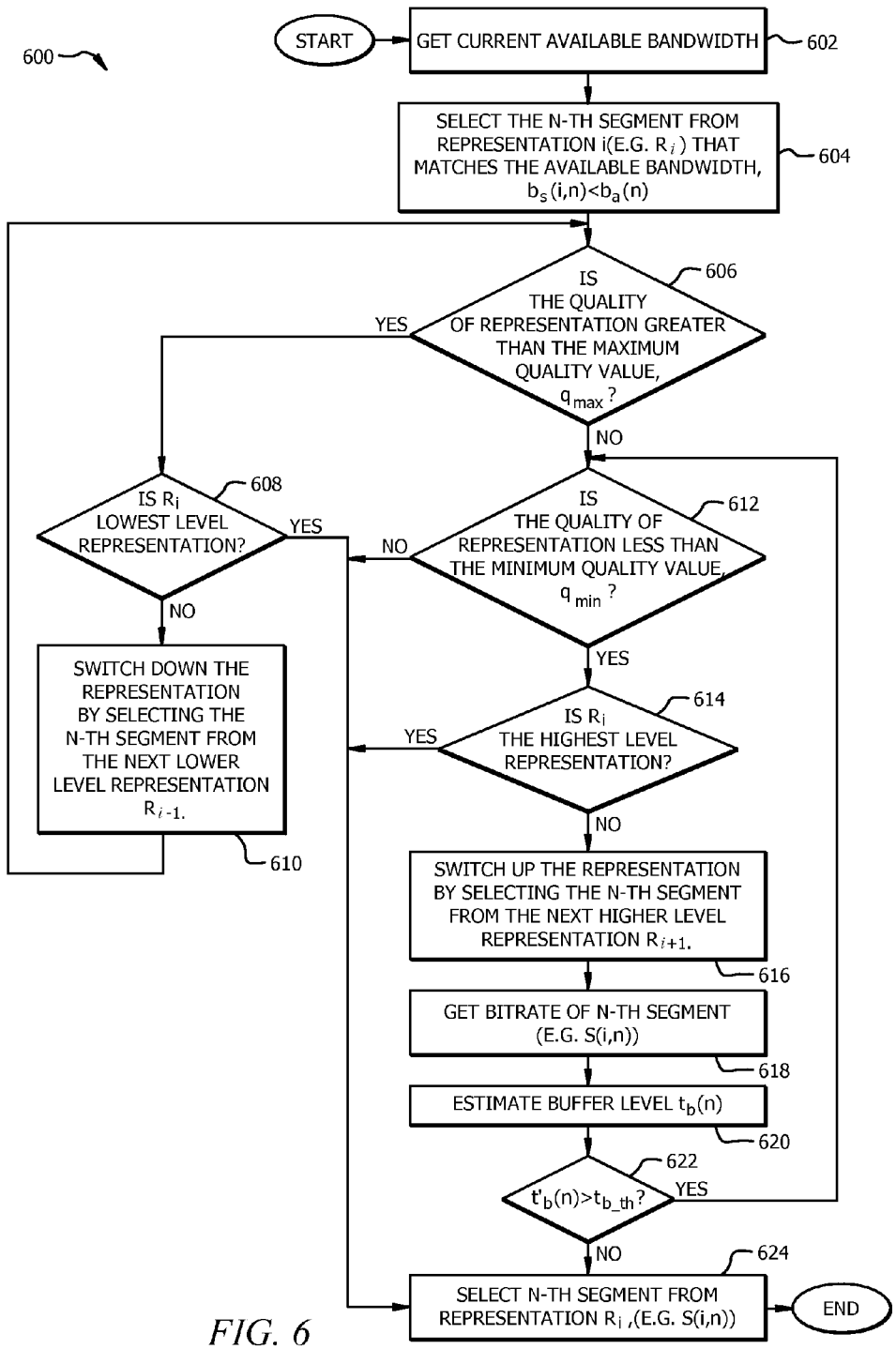
FIG. 6 is a flowchart of another embodiment of a method used for selecting and switching representations when downloading segments.

FIG. 6 is a flowchart of another embodiment of a method 600 used for selecting and switching representations when downloading segments for a media content. Method 600 may start at block 602 and obtain the current available bandwidth of the network and/or connection(s). Block 602 may be substantially similar to block 504 in method 500. Afterwards, method 600 may proceed to block 604 to select the n-th segment from $R_i$ that matches the available bandwidth $b_a(n)$ obtained in block 602. The variable $b_s(i, n)$ may denote the bitrate and/or bandwidth of segment S(i, n), which refers to the n-th segment from $R_i$. Method 600 may select the bitrate and/or bandwidth of the n-th segment (e.g. S(i, n)) such that $b_s(i, n)$ is less than $b_a(n)$.

Method 600 may then proceed to block 606 and determine if the quality of the representation (e.g. q) is greater than a maximum quality $q_{max}$. If the quality of the representation is greater than $q_{max}$, then method 600 may move to block 608. At block 608, method 600 may determine whether $R_i$ is the lowest level representation. In other words, method 600 may determine whether $R_i$ provides the lowest quality level for the n-th segment, or if other representations provide a lower quality level than $R_i$. If method 600 determines that $R_i$ is the lowest level representation, then method 600 proceeds to block 624 and selects the n-th segment from $R_i$. However, if method 600 determines that $R_i$ is not the lowest level representation, then method 600 may proceed to block 610 to switch down the representation by selecting the n-th segment from the next lower level representation i−1 ($R_{i-1}$). Once method 600 switches to the lower level representation, method 600 labels the switched to representation as $R_i$. Afterwards, method 600 may return to block 606.

At block 606, method 600 may move to block 612 when the quality of the representation (e.g. represented using a variable "q") is not greater than (e.g. less than or equal to) the maximum quality value $q_{max}$. At block 612, method 600 may determine whether the quality of the representation is less than the minimum quality value, $q_{min}$. If method 600 determines that the quality of the representation is not less than $q_{min}$ (e.g. greater than or equal to $q_{min}$), then method 600 may proceed to block 624 to select the n-th segment from $R_i$. However, if method 600 determines that the quality of the representation is less than the $q_{min}$, then method 600 may proceed to block 614. The quality values $q_{min}$ and $q_{max}$ may be set by the user or the operator that provide the service, or may be dynamically derived from previously downloaded segments.

At block 614, method 600 may determine whether $R_i$ is the highest level representation. In other words, method 600 determines whether $R_i$ provides the highest level of quality that produces the n-th segment, or whether other representations provide higher levels or quality than $R_i$. If method 600 determines that $R_i$ is the highest level, then method 600 moves to block 624. Alternatively, if method 600 determines that $R_i$ is not the highest level, then method 600 may proceed to block 616 to switch up the representation by selecting the n-th segment from the next higher level representation i+1 ($R_{i+1}$). Once method 600 switches to the higher level representation, method 600 labels the switched to representation as $R_i$.

Method 600 may move to block 618 after completing block 616 to obtain the bitrate of the n-th segment for $R_i$ (e.g. S(i,n)). Method 600 may have switched up and/or switched down representation in blocks 610 and 616, and may need to re-obtain the bitrate of the n-th segment for the current $R_i$. Once method 600 finishes block 618, then method 600 may move to block 620 and estimate the buffer level $t_b(n)$. Block 620 may estimate the buffer level $t_b(n)$ (e.g. $t'_b(n)$) using equation 1 as discussed in block 508 in method 500. Method 600 may then proceed to block 622 and determine whether $t'_b(n)$ is greater than the buffer threshold, $t_{b\_th}$. If method 600 determines that $t'_b(n)$ is greater than $t_{b\_th}$, then method 600 may move back to block 612. Buffer threshold, $t_{b\_th}$ parameter may be used in the adaptation algorithm, and may be sent by the user or the operator that provides the service. In another embodiment, the $t_{b\_th}$ parameter may dynamically be derived based on the monitoring of the network throughput. Otherwise, method 600 may move to block 624. Method 600 may subsequently end after completing block 624.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 70 percent, 71 percent, 72 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A method for adaptive streaming of a media content, the method comprising:

receiving a media presentation description that provides presentation information for the media content;

determining a plurality of representations from the media presentation description that comprise segments that are provided with bitrate and quality information;

selecting a media segment that meets a desired quality level to download from one of the representations;

obtaining an available bandwidth for downloading the media segment;

obtaining a bitrate of the media segment;

updating a buffered media time for downloading the media segment based on the available bandwidth for downloading the media segment, the bitrate of the media segment, and a duration of the media segment and a second buffered media time, wherein the second buffered media time corresponds to a second media segment downloaded prior to the media segment; and determining when to switch to another representation by comparing the buffered media time to a switching threshold value.

2. The method of claim 1, wherein the switching threshold value is a switch-down threshold, and the method further comprising switching to another representation with a lower quality when the buffered media time is less than the switch-down threshold.

3. The method of claim 1, wherein the switching threshold value is a switch-up threshold, and the method further comprising switching to another representation with a higher quality when the buffered media time is greater than the switch-up threshold.

4. A computer program product comprising computer executable instructions for adaptive streaming of a media content and stored on a non-transitory computer readable medium such that when executed by a processor cause a node to:

receive a media presentation description that provides presentation information for the media content;

determine a plurality of representations from the media presentation description that comprise segments that are provided with bitrate and quality information;

select a media segment that meets a desired quality level to download from one of the representations;

obtain an available bandwidth for downloading the media segment;

obtain a bitrate of the media segment;

update a buffered media time for downloading the media segment based on the available bandwidth for downloading the media segment, the bitrate of the media segment, and a duration of the media segment and a second buffered media time, wherein the second buffered media time corresponds to a second media segment downloaded prior to the media segment; and determine when to switch to another representation by comparing the buffered media time to a switching threshold value.

5. The computer program product of claim 4, wherein the switching threshold value is a switch-down threshold, and the computer program product further comprises computer executable instructions stored on the non-transitory computer readable medium such that when executed by the processor cause the node to switch to another representation with a lower quality when the buffered media time is less than the switch-down threshold.

6. The computer program product of claim 4, wherein the switching threshold value is a switch-up threshold, and the computer program product further comprises computer executable instructions stored on the non-transitory computer readable medium such that when executed by the processor cause the node to switch to another representation with a higher quality when the buffered media time is greater than the switch-up threshold.

* * * * *